United States Patent
Wilhelmy et al.

(10) Patent No.: US 8,539,811 B2
(45) Date of Patent: Sep. 24, 2013

(54) ROTARY TRANSDUCER WITH MONITORING OF THE BEARING WEAR AND METHOD THEREFOR

(75) Inventors: Lothar Wilhelmy, Berlin (DE); Bernhard Hiller, Berlin (DE); Jochen Wilhelmy, Erlangen (DE)

(73) Assignee: Baumer Hubner GmbH, Berlin (DE)

( * ) Notice: Subject to any disclaimer, the term of this patent is extended or adjusted under 35 U.S.C. 154(b) by 773 days.

(21) Appl. No.: 12/669,942

(22) PCT Filed: Jun. 20, 2008

(86) PCT No.: PCT/EP2008/004999
§ 371 (c)(1),
(2), (4) Date: Mar. 29, 2010

(87) PCT Pub. No.: WO2009/015735
PCT Pub. Date: Feb. 5, 2009

(65) Prior Publication Data
US 2010/0180664 A1     Jul. 22, 2010

(30) Foreign Application Priority Data
Jul. 31, 2007 (DE) .......................... 10 2007 036 271

(51) Int. Cl.
*G01M 13/04* (2006.01)
*G01D 3/08* (2006.01)
*G01P 21/00* (2006.01)
*F16C 19/52* (2006.01)
*H03M 1/10* (2006.01)

(52) U.S. Cl.
USPC ................. 73/1.75; 73/1.37; 702/34; 702/182

(58) Field of Classification Search
USPC .................... 73/1.37, 1.75, 1.79, 7, 497, 509, 73/587, 593, 865.9; 341/118–120; 384/448; 702/34, 81–82, 94, 96, 182–183, FOR. 135, 702/FOR. 137
See application file for complete search history.

(56) References Cited

U.S. PATENT DOCUMENTS 3,807,098 A * 4/1974 Schaller et al. .................. 451/5
4,383,208 A   5/1983 Nielson
(Continued)

FOREIGN PATENT DOCUMENTS

CA       2649642 A1 * 11/2007
DE   102004048649 A1    4/2006
(Continued)

OTHER PUBLICATIONS

International Preliminary Report on Patentability for PCT/EP2008/004999, report issued Feb. 2010.*

*Primary Examiner* — Thomas P Noland
(74) *Attorney, Agent, or Firm* — IP Strategies

(57) ABSTRACT

A rotary transducer has a detector device with a measurement sensor, used to generate a measurement signal representative of angular position and/or velocity of an object. The detector device has a rotary bearing and a material measure that can be rotated relative to the measurement sensor and is arranged in the measurement field of the latter. A monitoring device, connected to the measurement sensor, which can provide a state signal representative of the state of wear of the rotary transducer, is integrated in the rotary transducer. In order to be able to timely warn of mechanical failure of the rotary transducer, the monitoring device is provided with a register that can permanently store as value representative of the state of wear of the rotary bearing and is formed from the information relating to the angular position and/or velocity contained in the measurement signal.

22 Claims, 2 Drawing Sheets

(56) References Cited

U.S. PATENT DOCUMENTS

| | | | |
|---|---|---|---|
| 4,733,049 A * | 3/1988 | Lemelson | 219/121.69 |
| 4,738,336 A | 4/1988 | Smith et al. | |
| 5,615,609 A * | 4/1997 | Hill et al. | 101/183 |
| 5,621,159 A | 4/1997 | Brown et al. | |
| 6,244,174 B1 * | 6/2001 | Sirowitzki et al. | 101/212 |
| 6,265,867 B1 * | 7/2001 | Fowler | 324/207.25 |
| 6,417,662 B1 * | 7/2002 | Wallrafen | 324/174 |
| 6,830,379 B2 * | 12/2004 | Morita et al. | 384/448 |
| 8,017,904 B2 * | 9/2011 | Chase et al. | 250/231.16 |
| 2001/0008083 A1 * | 7/2001 | Brown | 73/146 |
| 2008/0133176 A1 * | 6/2008 | Kashio et al. | 702/183 |
| 2008/0216576 A1 | 9/2008 | Eckert et al. | |
| 2008/0234964 A1 * | 9/2008 | Miyasaka et al. | 702/113 |
| 2009/0152351 A1 * | 6/2009 | Nordlund et al. | 235/437 |
| 2009/0288480 A1 * | 11/2009 | Noda | 73/114.79 |

FOREIGN PATENT DOCUMENTS

| | | |
|---|---|---|
| DE | 102005032720 A1 | 1/2007 |
| EP | 425912 A1 * | 5/1991 |
| EP | 1480344 A1 * | 11/2004 |
| EP | 1564530 A1 * | 8/2005 |
| JP | 04317999 A * | 11/1992 |
| JP | 10253344 A * | 9/1998 |
| WO | 2007006691 A | 1/2007 |
| WO | WO 2008007478 A1 * | 1/2008 |
| WO | 2009/015735 A3 | 12/2009 |

\* cited by examiner

ROTARY TRANSDUCER WITH MONITORING OF THE BEARING WEAR AND METHOD THEREFOR

FIELD OF THE INVENTION

The present invention relates to a rotary encoder having integrated therein a detector device comprising at least one measurement sensor by which, during operation, a measurement signal can be generated that is representative of the angular position and/or velocity of an object which is connected to the rotary encoder, at least one rotary bearing, and at least one material measure which is rotatably arranged by means of the rotary bearing relative to the measurement sensor in the measurement field thereof, and a monitoring device which is connected to the measurement sensor such that data are transmitted. Furthermore, the present invention relates to a method for controlling the wear of a rotary encoder which during operation senses the angular position and/or velocity of a rotating object connected to the rotary encoder and outputs it as a measurement signal.

BACKGROUND OF THE INVENTION

Rotary encoders are used for many applications to monitor the angular position and/or velocity of an object connected to the rotary encoder, e.g. a rotating shaft. They may be part of a control circuit to adjust the angular position and/or velocity of the object to predetermined values with the help of an actuator, e.g. an electric motor.

The term "rotary encoder" encompasses encoders with incremental signals that are output either as rectangular signals or as sine signals. As a rule, these encoders have a zero pulse which is output once per revolution. The rotary encoders also encompass absolute encoders that, as single-turn encoders, sense the absolute position within one revolution or, as multi-turn encoders, additionally comprise a counting circuit for the number of the revolutions performed.

To connect such rotary encoders to existing control systems in an easy way and to recognize them automatically, EP 0 425 912 discloses a device called "electronic type label", wherein a non-volatile memory inside the rotary encoder contains data of the drive and of the rotary encoder. The non-volatile memory can be read out from outside the rotary encoder, e.g. by a control system.

Rotary encoders are critical components that upon failure or in case of disorders lead to a total failure of the system.

Measures are known in the prior art for monitoring a rotary encoder to find out whether disorder or damage is imminent. A maintenance or replacement of the rotary encoder can thereby be carried out in good time, and malfunction or damage can be avoided.

A monitoring system for rotary encoders is described in EP 0 883 249 A2, which forms the closest prior art, and in the divisional application EP 1 480 344 A1 issuing therefrom. According to the teachings imparted in these two publications the measurement sensor and the optically scanning encoding disc, which forms a material measure, output an analog signal the amplitude of which varies in response to the distance between the measurement sensor and the material measure and the degree of soiling. If for instance due to soiling of the encoding disc the amplitude falls below a predetermined value, an alarm signal is output. As a further measure, the output number of pulses between two reference marks is counted. If the output number is not identical with the encodings of the material measure actually exiting between the reference marks, a second alarm signal is output. The devices of EP 0 883 249 A1 and EP 1 4380 344 A1 thus monitor the function of the measurement sensor and the material measure.

It is described in EP 1 564 530 A1 that the amplitude of the signal gained from the detector device serves as an indicator of an axial movement of the encoding disc and thus of the magnitude of an axial load acting on the detector. Thus it can also be checked whether the axial load exceeds predetermined values.

A system for measuring the angular speed with a function for self-diagnosis is further described in U.S. Pat. No. 6,830,379 B2. A diagnosis circuit checks with the help of a dc voltage derived from a battery whether a transmitting coil that serves the wireless transmission of the detector signals is operative. Moreover, the signals of two measurement sensors can be compared with one another. In contrast to the abovementioned rotary encoders, the rotary sensors of U.S. Pat. No. 6,830,379 B2 are pick-ups that are inserted into bores of a bearing shell e.g. of an automotive vehicle wheel. A separate encoding disc mounted on the shaft is installed in the measurement field of the pick-up. In contrast to the rotary encoders described in EP 0 883 249 A2, EP 1 564 530 A1 and EP 1 480 334 A1, the rotary encoder of U.S. Pat. No. 6,830,379 B2 is not an integrated unit, but consists of several parts that are separately installed in a bearing.

Despite these known solutions, it is still unsatisfactory that especially a mechanical failure of the detector cannot be predicted in a reliable way.

In the case of rotary encoders the devices that are available on the market for monitoring bearings, for instance "EASY-Check" of the company FAG and "Octavis" of the company DDC Dethloff diagnostic consulting, can only be used to a limited degree. These devices are separate monitoring devices that are mounted on large machines for monitoring the ball bearings thereof.

BRIEF SUMMARY OF THE INVENTION

It is therefore the object of the present invention to improve the known rotary encoders such that damage caused by mechanical disorders can be avoided in a more reliable way.

This object is achieved for a rotary encoder of the aforementioned type according to the invention in that the monitoring device comprises a counter which can permanently store a value which is representative of the state of wear of the rotary bearing and is formed from the information contained in the measurement signal on the angular position and/or velocity.

As for the aforementioned method, the object is achieved according to the invention in that a state variable representative of the wear condition of a rotary bearing of the rotary encoder is internally monitored on the basis of the information contained in the measurement signal on the angular position and/or velocity, and a state signal representative of the functional state of the rotary bearing is output by the rotary encoder in response to the state variable. Rotary bearings include sliding and roller bearings, the latter encompassing roll, ball and needle bearings.

The solution according to the invention is simple and permits an efficient monitoring of the mechanical function of the rotary encoder, for the rotary bearing installed in the rotary encoders has surprisingly turned out to be a limiting factor in the use of rotary encoders. If the rotary bearing fails, the rotary encoder becomes useless.

In incremental encoders the zero pulses and in absolute encoders the transition during a full revolution can be used as information to sense the number of revolutions without regard to the direction of rotation.

With the methods described in EP 0 883 249 A2, EP 1 480 344 A1 and EP 1 564 530 A1, neither the state of wear nor, equivalently, the residual life of the rotary bearing can be determined. The risk of failure emanating from the rotary bearings of the rotary encoders has not been recognized in these publications yet. In contrast to the solutions pursued in these publications, the approach according to the invention regarding wear control is based on the information directly contained in the measurement signal on angular position and/or velocity and not on additional information, such as the amplitude of the measurement signal. This considerably simplifies the evaluation of the measurement signal.

The invention can be further improved by the following developments, each being advantageous per se, which can be combined with each other independently of one another.

For instance, in a first advantageous development the total operation revolution number of the rotary bearing can be sensed as a state variable. The total operation revolution number of the rotary bearing is the total number of revolutions performed substantially since the start of operation of the rotary bearing. This value can be directly supplied by the rotary encoder as a state signal to downstream evaluation or alarm electronics.

For sensing and/or further processing the state devices representative of the state of wear, a microprocessor can be integrated into the rotary encoder.

The total operation revolution number can be obtained in a particularly simple way for instance directly from the information contained in the measurement signal on the angular position in that the number of the revolutions measured by the rotary encoder is continuously added up. Furthermore, this can be done in that a reference signal which is produced once by the detector device at a specific angular position during a revolution of the rotary bearing is added up in the counter to obtain the total operation revolution number. Such a reference signal is e.g. the zero pulse.

On the one hand, the use of the total operation revolution number as a state variable is less troublesome in terms of design because simple electronic modules can be used. On the other hand, this design exploits the measurement properties of rotary encoders that due to the principle measure a variable closely associated with the revolution number or even the revolution number itself, so that essential information on the residual life of the rotary bearing is already present in the measurement signal itself. According to the invention this information is just also used for determining the state of wear of the rotary bearing.

In the rotary encoder itself, the total operation revolution number can be compared with a limit revolution number representative of the residual life. The limit revolution number is that speed starting from which one must statistically reckon with failure in case of a uniform operation of the rotary bearing, i.e. it corresponds to the life of the rotary bearing. The residual life and thus the state of wear of the rotary bearing follow from the difference between the total operation revolution number and the limit revolution number.

This simple determination of the state of wear of the rotary bearing can be improved if additional state variables are included in the determination of the state of wear, i.e. the limit revolution number.

For instance, a temperature sensor may be provided in the rotary encoder and the temperature of the rotary bearing or a temperature gradient in the rotary encoder are taken into account as the state variables representative of the wear of the encoder in the calculation of the residual life of the rotary bearing in the monitoring device. The rotary encoder can take into account the temperature measured as the life of the rotary bearing in a reducing way if it is above or below predetermined limit temperatures. The limit temperature can particularly correspond to an operative temperature reached during uniform operation, starting from which an accelerated aging of the rotary bearing, which is normally lubricated for lifetime, sets in.

According to a further variant a microprocessor with integrated temperature sensor that monitors the temperature of the rotary bearing and takes over the data processing of the measurement signals and/or state variables can be installed in the rotary encoder.

In a further embodiment, the rotary encoder may have provided therein a vibration, oscillation and/or structure-borne sensor which senses the vibrations produced by the rotary bearing during operation, as a further state variable representative of the state of wear. Vibrations of specific amplitude and/or frequency can point on the one hand to an increased mechanical load on the rotary encoder that has a life-shortening effect. On the other hand, strong vibrations during rotation of the rotary bearing may also be a sign of great wear of the rotary bearing. The different factors causing vibrations can be automatically distinguished by the rotary encoder due to their spectra. To be more specific, the rotary encoder can automatically take into account the life of the rotary bearing in a reducing way if the amplitude of the vibrations lies preferably at predetermined frequencies above predetermined stored limit values. To be more specific, the limit revolution number can be reduced when vibrations occur with an amplitude above a predetermined limit value at standstill of the rotary bearing as this case of load leads to particularly high wear.

With the help of the structure-borne sensors the correct installation of the rotary encoder can also be checked automatically, for in case of an incorrect installation noise arises that can be detected in that a limit value is exceeded.

To be able to assign the measured vibrations in the rotary encoder automatically to the individual causes, values of vibration amplitudes, frequencies and/or spectra empirically produced in the rotary encoder in advance for different states of wear of the rotary bearing can be stored in a preferably non-volatile memory. These values may encompass combinations of the detected state variables, such as revolution number, angular position and/or velocity in the form of a characteristic map. Furthermore, the combinations may have assigned thereto predefined reductions of the residual life e.g. in the form of a formula or of tables.

Furthermore, when the residual life is calculated, it can automatically be taken into account as life reducing when the angular velocity determined from the measurement signal is below a first stored limit velocity and/or above a second stored limit velocity. For instance, excessive loads on the rotary bearing are included in the calculated residual life at a very slow or a very fast rotation in that the limit revolution number is reduced. In a development a reversal of the rotational direction can be taken into account as life-reducing, or equivalently, as increasing the state of wear. A reversal of the rotational direction entails increased wear of the rotary bearing as the lubricant must be oriented anew each time. As a consequence, in this development the limit revolution number can be reduced with each reversal of rotational direction by a value depending on the constructional form or type of the rotary bearing.

Furthermore, the microprocessor integrated into the rotary encoder may comprise an internal clock. The clock can e.g. be designed as an operating-hour counter that measures that time interval during which the rotary encoder has so far been operated. In combination with a preferably non-volatile memory, times of service-relevant events that have led to a reduction of the total speed can be stored in addition. The clock may be designed in the form of a counter incremented at constant time intervals. Furthermore, time progressions of the state variables can be stored with the help of the clock as time profiles. Operational states can be detected automatically by the rotary encoder or microprocessor by using time profiles, said state's leading to a change in the residual life, for instance operation over a long period of time at a high speed.

Furthermore, in the rotary encoder a predetermined normal revolution number or one calculated e.g. by way of mean-value or median formation during operation can be stored in a preferably non-volatile memory. The rotary encoder can monitor deviations in the speed reached during operation from the normal revolution number and take them into account as having an impact on the life. To be more specific, when the normal revolution number is exceeded by a predetermined value, the limit revolution number can be reduced.

Moreover, self-learning structures, such as e.g. neuronal networks, can be implemented in the monitoring device so as to adapt the empirically determined stored values during operation of the rotary encoder automatically to the specific situation of application. To this end the stored values can be automatically changed by the monitoring device in response to the at least one state variable and/or in response to the measurement signal. For instance, the admissible operating temperature or, when several spaced-apart temperature sensors are used, a spatial temperature profile can be measured and stored at the beginning of the operating time at a fixed speed.

The state signal can particularly be output whenever the calculated residual life exceeds the limit life, or the residual life falls below a predetermined value. In this instance, the state signal can be output as a predefined alarm signal to point to this critical operative state. The state signal can be output as an optical signal, e.g. by way of a warning light, directly to the sensor. As an alarm signal, it differs in its design from a state signal that is representative of a non-critical operative state. The state signal can only be output as an alarm signal if e.g. a normal operative state need not be reported to the outside of the rotary encoder.

The reduction of the life on the basis of the at least one monitored state variable may be due to a reduction of the limit revolution number stored in the rotary encoder. This reduction can take into consideration the different impacts of the state variables on the residual life by way of automatic weighting. Instead of a reduction of the limit revolution number in the arithmetical reduction of the residual life, the total operation revolution number can be equivalently enhanced in an automatic way in response to said state variables.

Preferably in a further development the function of the detector device and/or the monitoring device can also be monitored via the microprocessor, as is e.g. known from EP 0 883 249 A2 and EP 1 480 344 A1. In response to the result of this monitoring operation a state signal representative of the functional state can be output, which signal can e.g. be read out via a data interface to the outside.

The state signal which is representative of the functional state of the detector device and/or the monitoring device can also be connected to the state signal representative of the wear state. For instance, a further state signal which is representative of the total state of the rotary encoder can be produced in response to said two state signals. For instance, said further state signal can be output as an alarm signal when the state signal representative of the state of wear of the rotary bearing indicates that the limit life has been exceeded, and the state signal which is representative of the function of the detector device and/or the monitoring device represents a malfunction.

In a further development the alarm signal can be output if one of the monitored state variables passes a predetermined alarm limit value or one adapted in a self-learning process, irrespective of the question which values the remaining state variables are just showing. It is to be ensured by way of this bypass function that in the case of strong deviations of only one state variable from the standard values a message is sent to the outside if the other state variables do not point to any faulty operative state. This measure even improves the operational reliability.

The rotary encoder is preferably built as a unit which accommodates all means in a common housing. The state variable representative of the state of wear of the rotary encoder can be stored in a permanent memory, for instance an electronic non-volatile memory, so that in case of failure of the power supply it is still maintained and the state of wear of the rotary encoder can be monitored substantially uninterruptedly.

BRIEF DESCRIPTION OF THE DRAWINGS

The invention shall now be explained in more detail by way of example with reference to embodiments taken in conjunction with the attached drawings, in which.

DETAILED DESCRIPTION OF THE INVENTION

Figure 1:
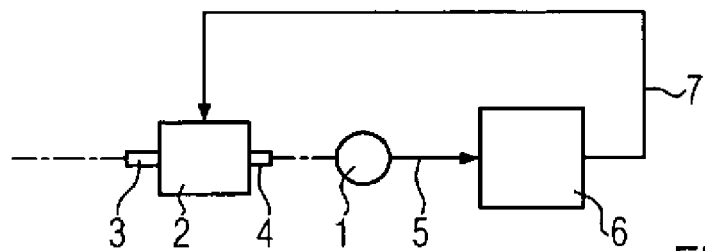
FIG. 1 is a schematic illustration showing the application of a rotary encoder according to the invention.

A typical application of a rotary encoder 1 is shown in FIG. 1. An actuator 2, e.g. an electric motor, drives a working machine (not shown in FIG. 1) with its drive shaft 3. The drive machine may e.g. be installed in a paper manufacturing machine and operate uninterruptedly at 1,500 revolutions per minute and thus perform $0.78 \times 10^9$ revolutions per annum.

The rotary encoder 1 is connected to the drive shaft 3 or, as shown in FIG. 1, to a second drive shaft 4 which is normally non-rotationally connected to the first drive shaft 3.

The rotary encoder 1 converts the angular position and/or velocity of the drive shaft 3 or 4 into electrical signals and supplies said values via a line 5 to a control device 6. The control device 6 derives a control signal from the measurement signal, the control signal being used via a line 7 for controlling the actuator 3 to observe predetermined setpoint values. In the case of a paper manufacturing machine the speed of the electric motor, for example, is to be kept constant.

In case of failure of the rotary encoder 1 the actuator 2 cannot be controlled any more.

Figure 2:
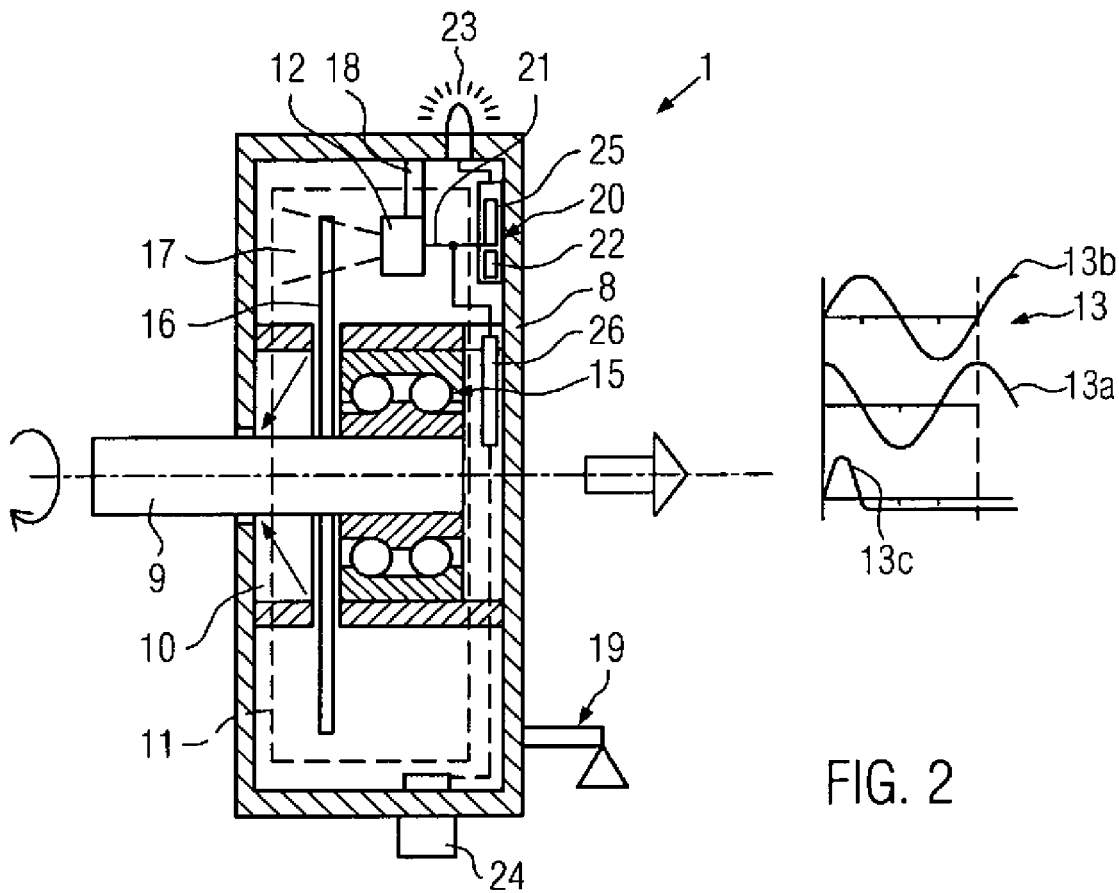
FIG. 2 is a schematic illustration showing the construction of a rotary encoder according to the invention.

The construction of the rotary encoder 1 will now be explained in more detail with reference to FIG. 2. The rotary encoder 1 comprises a preferably sealed and encapsulated housing 8 from which an encoder shaft 9 is projecting, to which a rotating object to be monitored, e.g. the drive shaft 4, is connectable. As shown in FIG. 2, the encoder shaft 9 may be provided as a solid shaft and then be connected via a flange (not shown) to the drive shaft 4. The encoder shaft 9, however, may also be designed as a hollow shaft to be slidable onto the drive shaft 4. The interior of the rotary encoder 1 is sealed in a dustproof and preferably also waterproof way via sealing elements 10. For specific applications the interior of the rotary encoder may also be encapsulated in an explosion-proof way.

A detector device 11, which is schematically shown in FIG. 2 by way of broken lines, is arranged in the interior of the housing 8. The detector device 11 comprises a measurement sensor 12 by which during operation a measurement signal which is representative of the angular position and/or velocity of the object, which is connected via the encoder shaft 9 to the rotary encoder 1, can be produced, for example with a quadrant signal from a sine wave 13a, a cosine wave 13b, and a reference signal 12c produced once or several times per revolution at a predetermined angular position.

Furthermore, the detector device 11 comprises a rotary bearing 15, e.g. in the form of a roller bearing, and at least one material measure 16.

The rotary bearing 15 may be a life-lubricated roller bearing. The life of the rotary bearing 15 is limited; it is e.g. about five years because of the service life of the lubricant in the rotary bearing. With this life a limit revolution number of about $4 \times 10^9$ revolutions is achieved for the above-mentioned paper manufacturing machines. This corresponds to about 40,000 operating hours in consideration of standstill times.

The material measure 16 is rotatably arranged via the rotary bearing 15 relative to the measurement sensor 12 in the measurement field 17 of the latter. For instance, the material measure may be configured in the form of an encoding disc 9 which is substantially non-rotationally connected to the encoder shaft 9 and which is circumferentially provided with equidistantly arranged optical and/or magnetic trigger elements. During passage through the measurement field 17 the trigger elements effect the generation of a measurement pulse in the measurement signal 13, 14 by means of the measurement sensor 12. The measurement sensor 12 can be fixedly connected to the housing 8, as is schematically illustrated by the holding device 18. The housing 8 is supported via a moment support 19 on an object (not shown in FIG. 2) that is stationary in relation to the encoder shaft 9, e.g. a motor plate or a foundation.

Furthermore, the rotary encoder 1 is provided with a preferably electronic monitoring device 20, e.g. a microprocessor, which is connected, for instance via a line 21, to the measurement sensor 12 to transmit data. The monitoring device 20 may comprise a signal generator 22 by which during operation and in response to the information contained in the measurement signal 13 on the angular position and/or velocity, a state signal representative of the state of wear of the rotary encoder 1 is output, for instance in the form of a light alarm 23 or an electrical signal via a plug-in connection 24.

The electronic monitoring device 20 further comprises a counter 25 in which a value representative of the state of wear of the rotary bearing 15 is permanently storable.

The rotary encoder 1 may comprise a correction device 26 which filters and corrects the measurement signal 13 before it is supplied together with the state signal via the plug-in connection 24 to downstream devices, for instance the controller 6. The measurement signal 13 and the state signal can be output in analog or digital form.

Figure 3:
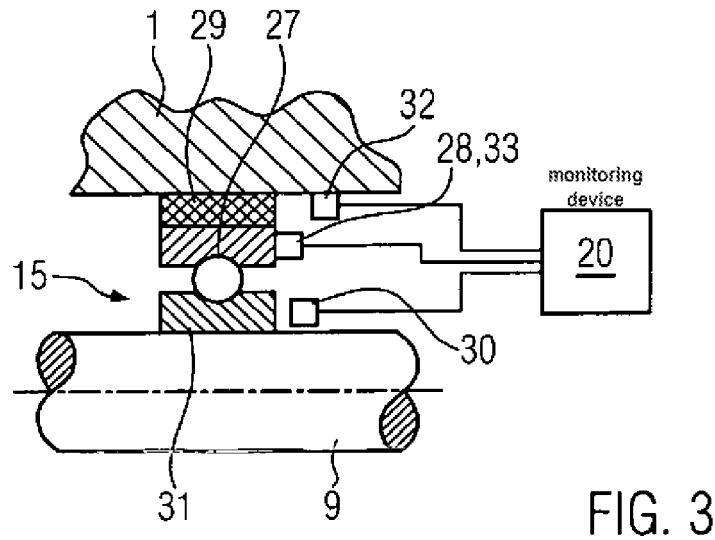
FIG. 3 is a schematic illustration showing a detail of a rotary encoder according to the invention.

The construction of the rotary encoder 1, which is schematically shown in FIG. 2, can be modified, as shown in FIG. 3.

A structure-borne sound sensor 28 which senses the vibrations produced during rotation of the encoder shaft 9 by the rotary bearing 15 is mounted on an outer ring 27 of the rotary bearing 15 or on another element of the rotary encoder 1.

The measured vibrations can be compared in a self-learning process inside the monitoring device 20 automatically with a vibration or noise pattern that was stored in the monitoring device 20 when the rotary encoder was newly installed. When the state variable sensed by the structure-borne sound sensor 28 exceeds a predetermined value or deviates from a predetermined distribution beyond a predefined measure, this is taken into account in the output of the state signal 23.

The rotary bearing 15 can be installed surrounded by an electrical and preferably also thermally insulating intermediate ring 29 and thus in an insulated state in the rotary encoder 1, which is just shown schematically in FIG. 3, so as to prevent damage to the electronics of the rotary encoder by bearing currents, for example, from the actuator 2.

Furthermore, a temperature sensor 30 which senses a temperature of an inner ring 31 of the bearing may also be provided in the rotary encoder. The temperature sensor 30 can particularly be configured to monitor, without any contact, the radiant heat of the inner ring 31 of the bearing that is rotating relative thereto.

A further temperature sensor 32, for example as an integrated component of a microprocessor, can monitor the temperature of the rotary encoder at a place separated by the intermediate ring 29 from the inner ring 31 of the bearing, for instance, on the housing 8. A temperature sensor 33 may also be provided on the outer ring 27 of the rotary bearing 15.

When the temperature sensors 30, 32 and 30, 32, 33, respectively, are used, the monitoring device 11 receives information on the temperature gradients from the shaft to the housing 8. The temperature gradient depends on the respective speed and the state of wear of the rotary bearing 15. It is thus a measure of the residual life that is still achievable by the rotary bearing.

An initial temperature gradient which is compared with the temperature gradient sensed by the at least one temperature sensor 30, 32, 33 can be stored in the monitoring device 20 in a self-learning process.

The sensors 28, 30, 32, 33 are particularly arranged inside the housing 8 (cf. FIG. 1) of the rotary encoder 1.

Figure 4:
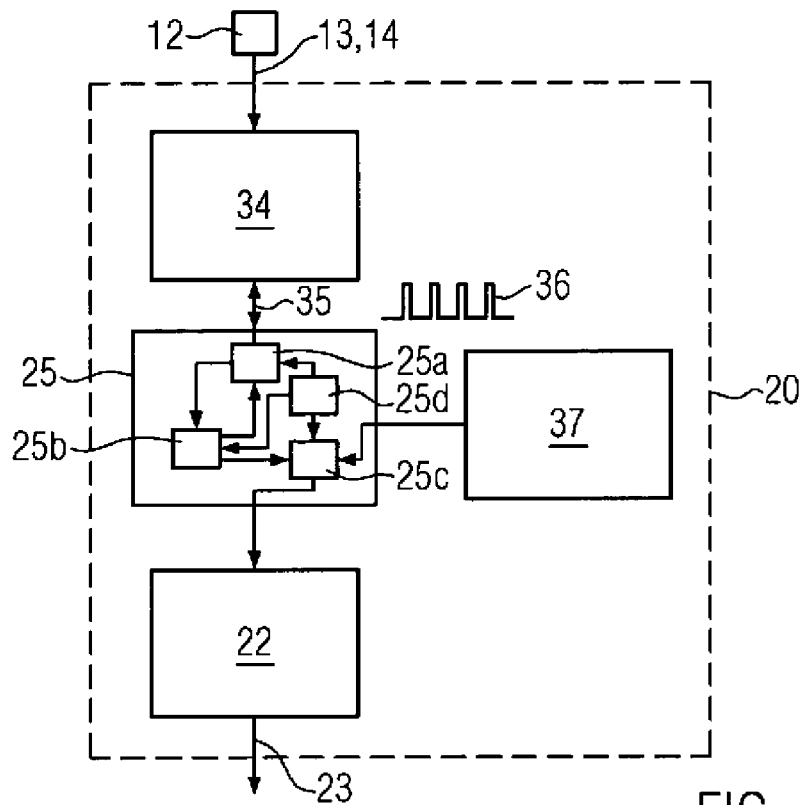
FIG. 4 is a schematic illustration showing the construction of an embodiment of a monitoring device according to the invention.

With reference to the schematic illustration of FIG. 4, the function of the rotary encoder 1 according to the invention shall now be explained.

The monitoring device 20 is fed with the measurement signal 13 as a state variable descriptive of the state of wear of the rotary bearing 10.

In a first step, a revolution signal 34 is obtained in a signal conditioning device 34 from the measurement signal 13, said revolution signal containing a specific number of count pulses 36, preferably a single count pulse, for each revolution of the encoder shaft 9.

Such a signal can be obtained, especially directly, from the reference signal 13c in the measurement signal or however from the quadrant signals 13a, 13b because the number of the marks triggering a measurement pulse is known on the material measure 16 per revolution. As an alternative, the revolution signal 35 can also be calculated by integration of the speed signal. When a reference signal 14 is directly produced by the measurement sensor 12, the signal conditioning device 34 can also be omitted.

In the counter 25, the number of the revolutions measured by the detector device 11 is added up as a state variable representative of the state of wear, resulting in a total operation speed of the rotary bearing 15, and said number is stored permanently. For adding the revolution values the counter 25 may comprise an adding mechanism 25a, for instance in the form of a microprocessor, and preferably an electronic non-volatile memory 25b for permanently storing the total operation revolution number. Apart from the total operation revolution number, the non-volatile memory 25b can preferably store further parameters, such as the constructional features of the rotary encoder 1, for instance the number of the marks on the material measure 16, as well as information on the manufacturer.

The non-volatile memory 25b can e.g. be addressed via a bus system (not shown) and read out by other devices, e.g. the controller 6, via standardized protocols as a state signal 23.

Furthermore, the monitoring device 20 comprises a permanent memory 37 which contains a previously stored limit revolution number of the rotary bearing 15 as the life limit thereof. In the present example the total revolution number has $4 \times 10^9$ revolutions. A comparator 25c provided in the counter 25 compares the total operation revolution number with the limit revolution number and outputs the state signal 23, for instance via the signal generator 22, if the total operation revolution number rises above the limit revolution number and/or if the difference of the two values falls below a predetermined limit value. The limit revolution number is representative of the life of the rotary bearing 15; the total operation revolution number is representative of the state of wear of the rotary bearing 15. Its difference is a representative-value of the residual life.

The counter 25 may also comprise a clock 25d, e.g. in the form of a counter incremented at constant time intervals. Furthermore, the clock can store the operating hours of the rotary encoder in a non-volatile way.

The signal generator 22 can be configured as an electronic data interface that outputs standardized or predetermined signals or signal sequences 23, or as a signal transmitter it can operate e.g. an LED or other display instruments. For instance, an LED which is at least two-colored in red and green may be used, the LED being switched to green as long as the total operation revolution number or a first limit value which is below the total operation revolution number and serves as a first warning stage and which may particularly amount to about ¼ to ½ of the total operation revolution number is not exceeded. If the first limit value is exceeded, more and more red is added to the green portion of the LED with an increasing total operation revolution number or a decreasing difference between total operation revolution number and limit revolution number, so that the LED seems to become more and more orange. If the limit life is exceeded, the signal 23 is automatically output in the form of an alarm signal. The alarm signal represents an operative state which necessitates intervention by the personnel and it points e.g. to functional errors or to wear. As soon as the limit revolution number has been exceeded, the LED is then switched to red.

The advantage of the method lies in the very simple monitoring of the wear of the rotary bearing, which is solely carried out on the basis of the measurement signals 13, 14 produced during normal operation of the rotary encoder 1.

In a development of a method, the counter 25 can automatically take into account the angular velocity sensed by the measurement sensor 12 in addition to the number of the revolutions, when the state of wear is determined. If the measured angular speed is above a first limit speed, e.g. 1,500 rpm, or below a second limit speed, e.g. 750 rpm, the total revolution number is reduced. The increased wear during operation beyond the limit speeds is thereby included in the calculated state of wear of the rotary bearing 15. Moreover, a reversal of the rotary direction can be sensed by the counter and is automatically taken into account as the limit revolution number in a reducing way. With the help of the clock 25d the times and the values of the state variables which have led to a decrease in the limit revolution number can be stored. Moreover, time profiles of the state variables monitored by the rotary encoder can be determined. For instance, the frequency of a change in the state variable per time unit can be automatically taken into account upon change in the limit revolution number. For instance, during operation of the rotary encoder for a long period of time at a substantially constant speed and a substantially constant temperature, the limit revolution number can be increased, which means a prolongation of the residual life. In the above-mentioned paper manufacturing machines, the limit revolution number is e.g. increased from $4 \times 10^9$ to $5 \times 10^9$ when the speed determined during operation ranges from 500 to 1000, i.e. about ⅓ to ⅔ of the speed of relevance to the limit revolution number.

Figure 5:
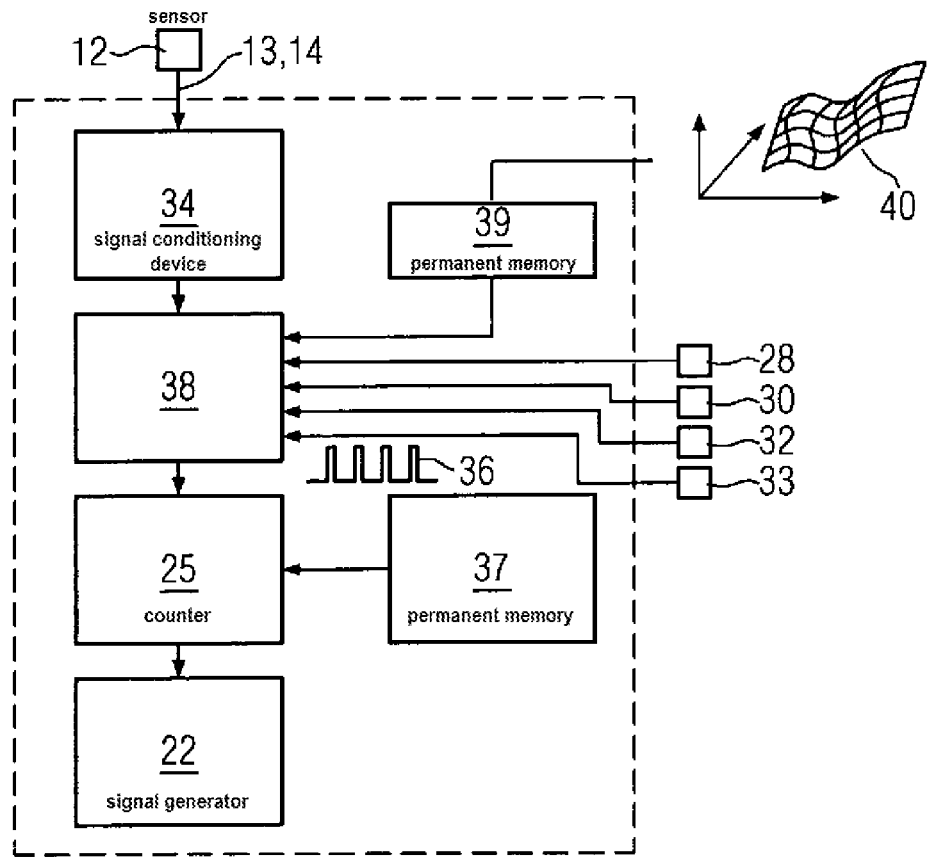
FIG. 5 is a schematic illustration showing the construction of a further embodiment of the monitoring device according to the invention.

The method shown in FIG. 4 can further be supplemented in that the signals of the additional sensors shown in FIG. 3 are taken into account as state variables for the state of wear of the rotary bearing 15. Such a method shall now be explained by way of example with reference to FIG. 5. To simplify matters, just the differences with respect to the embodiment of FIG. 4 shall be discussed. FIG. 5 uses the reference numerals of FIG. 4 as far as known elements are concerned.

In the method of FIG. 5, a calculating device 38 is additionally provided that receives the signals of the sensors 28, 30, 32, 33 and can retrieve empirically determined characteristic curves 40, which are stored in a permanent memory 39, as input values.

The calculating device 38 takes into account that the life of the rotary bearing 15 can strongly decline in comparison with the life indicated for a uniform operation at an almost constant temperature and speed when the rotary bearing 15 is operated under greatly varying conditions. For instance, the limit life in the form of the limit revolution number can be reduced by the calculating device 38 if for instance operation takes place at very low temperatures or at very high temperatures that are below or above corresponding limit temperatures. For instance, if in a self-learning process it is automatically determined by the rotary encoder 1 in the course of the first operating hours, or if it is fixedly pre-programmed that during normal operation a bearing temperature of 70° prevails, the limit revolution speed can be reduced by a predetermined value with each degree of temperature increase after the end of a predetermined number of revolutions. Likewise, the temperature gradient to be set during normal operation via the temperature sensors 28, 30, 32 can be automatically pre-defined or pre-programmed by the rotary encoder in a self-learning process. This is equally true for strong vibrations of the rotary bearing during operation.

Instead of a change in the limit revolution number the revolution numbers can also be weighted in response to the state variables prevailing during said revolutions while the total operation revolution number is added up.

The characteristic maps 40 can be stored in tabular form or as formulae in the memory 39. Especially with the use of multidimensional characteristic maps the combined influences on the life, e.g. an operation at high speed and simultaneously high vibrations at low temperatures, can be taken into account.

If one of the monitored state variables greatly differs from the values prevailing during a trouble-free operation, for instance when said variable passes a predetermined alarm limit value, the alarm signal can then be output also independently of the values of the other monitored state variables.

This is for instance the case whenever critical temperatures are exceeded in the rotary encoder; which temperatures might also impair electronic components, or if very strong vibrations occur after which it can no longer be guaranteed that the rotary encoder is operative.

The microprocessor 25 can also carry out the monitoring of the function of the detector device 11 and of the monitoring device 20 and of the sensors 28, 30, 32, 33, which is known per se. The result of this monitoring operation can be linked with the result of the monitoring of the state of wear. For instance, a state signal representative of a faulty operative state can be output whenever the monitoring of the wear state shows that the limit life has been passed, and/or when the functional monitoring shows a functional error. This can e.g. be carried out by way of a logic OR operation of the two monitoring results and the state variable, respectively.

The invention claimed is:

1. A rotary encoder having integrated therein a detector device comprising at least one measurement sensor by which, during operation, a measurement signal can be generated that is representative of the angular position and/or velocity of an object which is connectable to the rotary encoder, at least one rotary bearing, and at least one material measure which is arranged rotatable relative to the measurement sensor in the measurement field thereof by means of the rotary bearing, and a monitoring device which is connected to the measurement sensor such that data are transmitted, wherein the monitoring device comprises a counter which can permanently store a value which is representative of the state of wear of the rotary bearing and is formed from the information contained in the measurement signal on the angular position and/or velocity.

2. The rotary encoder according to claim 1, wherein the rotary encoder comprises a housing in which the detector device and the monitoring device are accommodated.

3. The rotary encoder according to claim 1, wherein the counter comprises a non-volatile electronic memory.

4. The rotary encoder according to claim 1, wherein the counter comprises an adder in which at least during operation a revolution number formed from the measurement signal can be added up.

5. The rotary encoder according to claim 1, wherein the monitoring device comprises a comparator by which a value of the revolution number stored in the counter can be compared with a predeterminable limit value.

6. The rotary encoder according to claim 1, wherein the rotary encoder has integrated therein at least one temperature sensor by which a temperature representative of the rotary bearing can be sensed.

7. The rotary encoder according to claim 1, wherein the rotary encoder has integrated therein a structure-borne sound sensor by which a structure-borne sound produced by the rotary bearing during operation can be sensed.

8. A method for monitoring wear of a rotary encoder which during operation senses the angular position and/or velocity of a rotating object connected to the rotary encoder and outputs it as a measurement signal, wherein a state variable representative of the wear condition of a rotary bearing of the rotary encoder is monitored on the basis of the information contained in the measurement signal on the angular position and/or velocity, and a state signal representative of the functional state of the rotary bearing is output by the rotary encoder.

9. The method according to claim 8, wherein the rotary encoder adds up the revolutions independently of the rotary direction as a state variable.

10. The method according to claim 9, wherein the rotary encoder directly provides the added-up number of revolutions as a state signal.

11. The method according to claim 8, wherein the rotary encoder internally senses the temperature of the rotary bearing as a state variable.

12. The method according to claim 8, wherein the rotary encoder internally senses the vibrations of the rotary bearing as a state variable.

13. The method according to claim 8, wherein the rotary encoder directly determines, on the basis of the measurement signal, the number of revolutions of the rotary bearing performed since the start of operation.

14. The method according to claim 8, wherein the rotary encoder compares the state variable with a previously stored value and generates the state signal in response to the result of said comparison.

15. The method according to claim 14, wherein the rotary encoder outputs the state signal whenever a residual life calculated on the basis of the state variable falls below a stored residual life.

16. The method according to claim 15, wherein the rotary encoder indicates a shortened rotary bearing life if the angular velocity determined from the measurement signal is below a first stored limit velocity and/or above a second stored limit velocity.

17. The method according to claim 16, wherein the rotary encoder indicates a shortened rotary bearing life if the monitored temperature is below a first stored limit temperature and/or above a second stored limit temperature.

18. The method according to claim 15, wherein the rotary encoder indicates a shortened rotary bearing life if the amplitude of the monitored vibrations are above a stored limit value.

19. The method according to claim 8, wherein in the rotary encoder the time progression of the at least one state variable is stored to be readable from outside the rotary encoder.

20. The method according to claim 8, wherein the rotary encoder monitors the function of the detector device and/or the monitoring device and outputs a state signal representative of the functional state thereof.

21. The method according to claim 20, wherein an alarm signal which is representative of a faulty operative state is output when during monitoring of the wear state the limit life is passed and/or the state signal representative of the function monitoring represents a malfunction.

22. The method according to claim 8, wherein, when an alarm limit value is exceeded by a monitored state variable, an alarm signal is output independently of the values of the other monitored state variables.

* * * * *